March 1, 1966  C. A. MARTIN  3,237,527
FLUID PRESSURE ACTUATED MOTOR HAVING MOVEMENT DAMPING MEANS
Filed Sept. 26, 1962  2 Sheets-Sheet 2
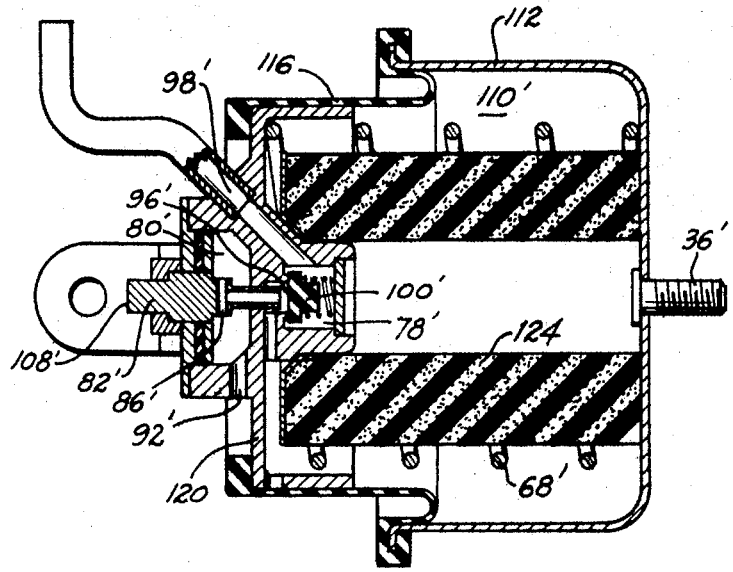
FIG_3
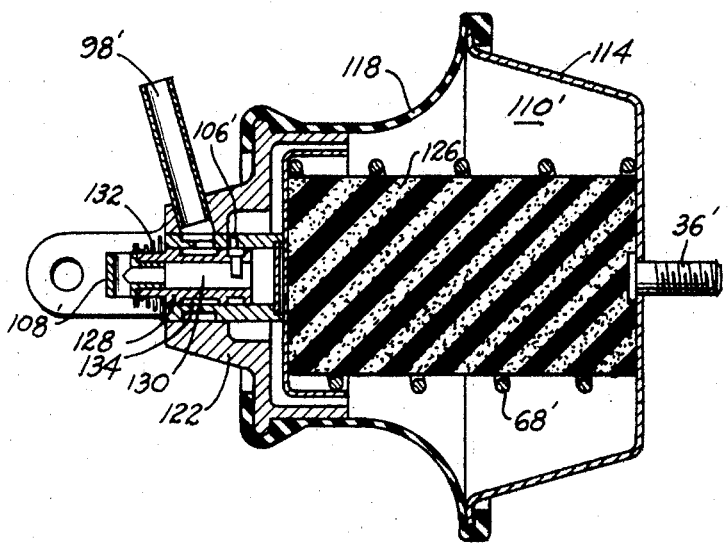
FIG_4
INVENTOR.
CHESTER A. MARTIN.
BY
Richard G. Geib
ATTORNEY.

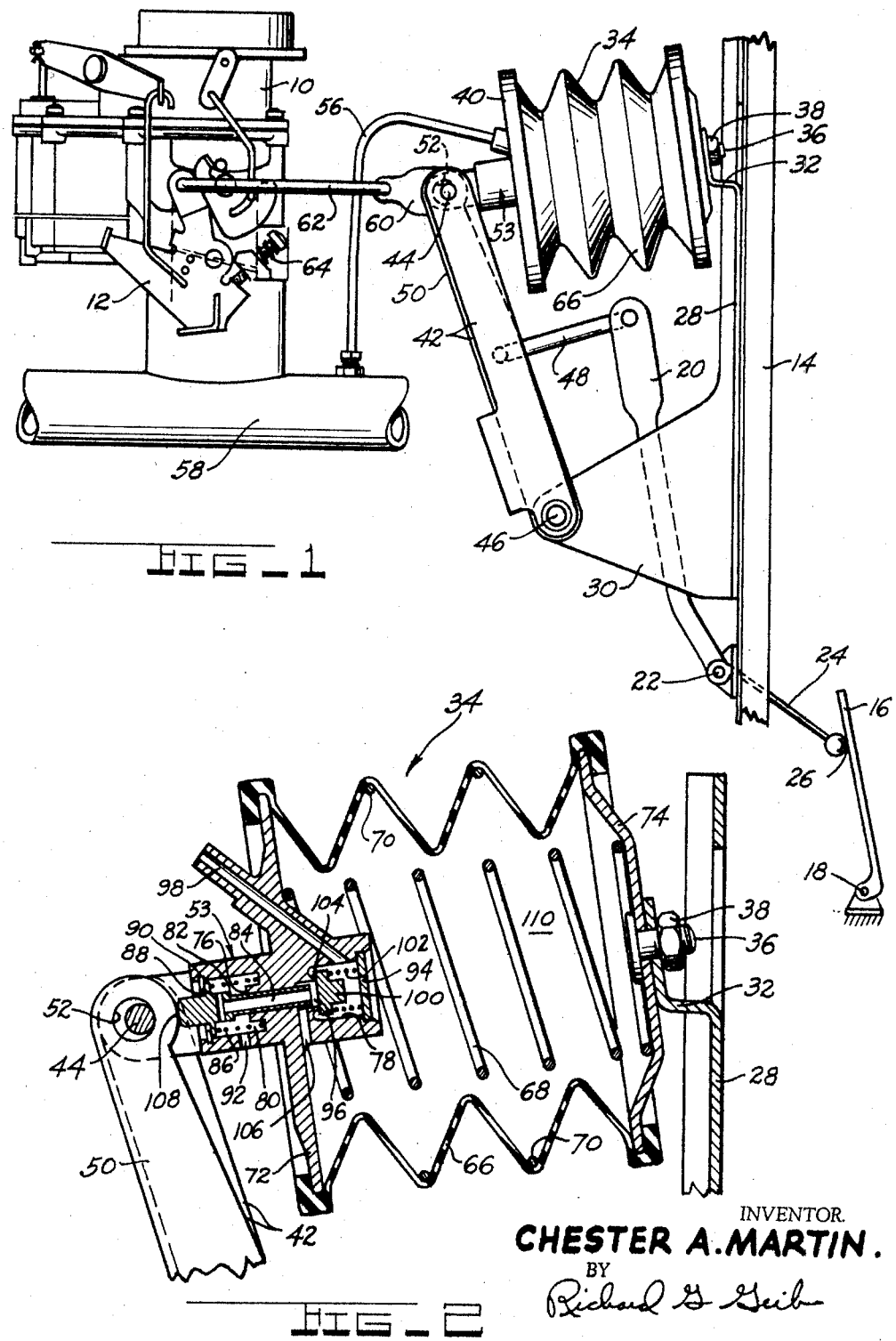

United States Patent Office 3,237,527
Patented Mar. 1, 1966

3,237,527
FLUID PRESSURE ACTUATED MOTOR HAVING MOVEMENT DAMPING MEANS
Chester A. Martin, South Bend, Ind., assignor to The Bendix Corporation, South Bend, Ind., a corporation of Delaware
Filed Sept. 26, 1962, Ser. No. 226,426
2 Claims. (Cl. 91—377)

The present invention relates to a means for decreasing the effort needed to operate the accelerator pedal of an automobile. More particularly this invention concerns a servomotor connection between an accelerator pedal and a carburetor throttle.

With the advent of the automatic transmission it has been necessary to provide means for rapidly shifting into the so-called passing gear. Present day automobiles with their high loaded linkages have increased the force required for such shifting to the order of thirty-five pounds and more. In addition, the compactness of present day automobile engine compartments has reduced the amount of linkage travel and, thus the amount of leverage the car manufacturer can put into an accelerator connection with the carburetor. This compactness has also changed the trend from position responsive type controls to pressure responsive type controls.

Therefore, it is the principal object of this invention to provide a power assist for the operator of a motor vehicle accelerator.

It is also an object of this invention to link an accelerator control with a valve controlling a pressure responsive device that is linked with the throttle of a carburetor.

A further object of this invention is to provide an automobile with an atmospheric-suspended type motor that is adapted to control a throttle under the direction of an operator's foot on an accelerator pedal.

A still further object of this invention is to reduce the amount of travel of an accelerator pedal in controlling vehicle acceleration.

Other objects and advantages may be found by those skilled in the art from the following description of the drawings in which:

FIGURE 1 shows a power throttle system in accordance with the present invention;

FIGURE 2 is a cross sectional side view of my power means showing the valve mechanism therefor;

FIGURE 3 is a cross sectional side view of a modified power means in accordance with my invention; and FIGURE 4 is another cross sectional view of a still further modified power means.

Now with particular regard to FIGURE 1, I show a carburetor 10 having a throttle lever 12. In the passenger compartment behind a firewall 14, the usual accelerator pedal 16 is pivotally mounted, as at 18, to an automobile floor board. I do not, however, propose to be limited to such a conventional accelerator pedal arrangement for it is well within the intent of this invention to utilize the pedalless floorboard design of the copending United States application Serial No. 140,060, now Patent No. 3,108,651, assigned to the common assignee.

As shown by FIGURE 1, however, a lever 20 is pivoted forward of firewall 14, as at 22, and this lever has a rod extension 24 passing through the firewall to engage the accelerator pedal 16, as at 26. Thus, as the operator presses down on the accelerator the lever 20 moves toward the firewall 14 or to the right as viewed in FIGURE 1.

On the forward side of the firewall a bracket 28 is mounted by any familiar means such as bolts, etc. The bracket is provided with a pair of parallel ears 30 adjacent the bottom and with a stamped or similarly manufactured projection 32 adjacent the top.

A motor 34 of the atmospheric-suspended type, which, as may be readily understood by those skilled in the art, can take the form of any fluid pressure responsive type motor without detracting from the present invention, is mounted to projection 32 as by a stud 36 and a nut 38. The forward end 40 of the motor is pivotally connected with the ears 30 by a pair of links 42. This connection is provided by pin 44 joining links 42 to motor 34, and pin 46 pivoting the links to ears 30.

The lever 20 has a link 48 that is connected to a lever 50 located between links 42 so that, as the accelerator is pressed inwardly towards the firewall, the lever 50 is moved about pin 44. As seen in FIGURE 2, the lever 50 is drilled to form a continuous surface 52 eccentrically arranged with respect to pin 44 such that it moves inwardly a predetermined distance as the lever 50 is forced inwardly towards the firewall 14. Thus, a valve 53 is first operated to control a motor, as explained hereinafter, and in the event the motor fails to function the surface 52 bottoms on pin 44 to form a direct mechanical connection between the accelerator pedal 16 and the throttle lever 12.

Referring back to FIGURE 1, the motor 34 is communicated to a vacuum source schematically shown by line 56 that leads to an intake manifold 58. In addition, a bifurcated adaptor 60 is mounted to the forward end 40 of the motor 34 to connect a throttle rod 62 to the motor. Such an adaptor allows for pivoting of lever 50 but yet moves with the motor 34 to pull throttle lever 12 off the idle adjustment screw 64 to increase the power developed by an engine (not shown).

As for the details of my motor 34, attention is again directed to FIGURE 2 showing the motor as having a flexible portion or collapsible wall, as it may be termed, 66 biased to an axially extended position by a spring 68 and to a radially extended position by coils 70. To the ends of the wall 66 I have sealingly secured end plates 72 forming the forward and rearward ends, respectively. The stud 36 is rigidly held by end plate 74 to enable mounting of the motor, as aforementioned. The end plate 72 is provided with an opening 76 that communicates a chamber 78 with a chamber 80. A valve plunger 82 is oriented to slide within opening 76, which plunger 82 is provided with an internal passageway 84 that opens into chamber 80. The plunger is also biased by a spring 86 to a position where its flange 88 abuts a lock ring 90 fixed in the end of chamber. The chamber 80 is opened to atmosphere by a passage 92.

The chamber 78, as seen in FIGURE 2, is closed by a plate 94 at one end and opened into the space enclosed by wall 66 and end plates 72 and 74 at the other end through a cavity 96. In addition, a passage 98 is provided through the end plate 72, which passage 98 may be connected to the aforementioned line 56 (see FIGURE 1).

Within the chamber a plug valve 100 is biased, as by spring 102, to engage a valve seat 104 surrounding the cavity 96. The cavity is connected to a passage 106, and thus, valve 100 blocks communication of chamber 78 with passage 106.

In operation, as the accelerator pedal is depressed the cam surface 52, which is in contact with the head 108 of plunger 82, causes the plunger to move inwardly. Such inward motion first causes the passage 84 to seal against the plug valve 100 to close off atmospheric pressure communication between chamber 80 and cavity 96. Secondly, further pressure on the accelerator pedal causes the displacement of valve 100. This allows vacuum communication to the interior chamber 110 formed by wall 66 and end plates 72 and 74. Depending upon the amount of vacuum drawn in chamber 110, the motor 34 collapses to pull throttle rod 62 to open the carburetor throttle.

As for the modifications presented by FIGURES 3 and 4, I have shown how a simple motor can be manufactured having a two-part wall comprised of rigid portions 112 and 114 of FIGURES 3 and 4, respectively, to which are, respectively, operatively connected flexible portions 116 and 118. With such construction only one end plate 120 and 122, respectively, is needed for each motor, and as seen in FIGURE 3 the valve construction can be similar to that of motor 34 above described. The prime numbers refer to similar parts previously described with reference to FIGURE 2.

I have found that in some instances the motor has a tendency to flutter due to volumetric capacity, valve operation and low resistance to collapsing of the motor. I have been able to solve this problem by placing a body of elastomeric foam or other compressible porous body within the motor chamber 110 or 110'. As seen in FIGURE 3, this body may take the shape of an annular ring 124, or, as in FIGURE 4, it may be in the form of a cylindrical plug 126. In addition it may be in even looser form, such as granular form, so long as there are means to prevent escape from the chamber.

Furthermore, with regard to FIGURE 4, I have shown a simple slide valve 128 having a central passage 130, and normally urged by a spring 132 to open the chamber 110' to atmosphere through a passage 106'. Inward movement of valve 128 closes communication of passages 130 and 106' and creates communication between passages 98' and 106' by way of the annular groove 134 in the valve body.

I have described my invention with regard to the applicable patent statutes and rules in order to obtain a patent. However, as may be readily recognized by those skilled in the art, my invention is susceptible to many forms not herein described for reasons of brevity. Therefore, I do not intend to be limited by the foregoing description but rather by the appended claims which set forth the true scope of my invention.

I claim:
1. A differential pressure motor comprising:
   a pair of opposed walls closed by a flexible portion to define a variable volume chamber such that one of said walls is movable towards the other when a pressure differential is created across said one of said walls;
   a valve device operatively connected to said motor to monitor the pressure differential;
   a vacuum source communication means in fluid communication with said valve device whose communication within said motor is monitored by said valve device;
   a positive pressure source differing from said vacuum source, which positive pressure source is in fluid communication with said valve device and whose communication within said motor is also monitored by said valve device; and
   a pressure damping means within said differential pressure motor including a porous, collapsible mass in the variable volume chamber between the opposed walls, said porous, collapsible mass having the pores thereof open to the interior of said variable volume chamber to prevent sudden, erratic movement of said one of said walls toward the other in that the porous collapsible nature of the mass is such that the evacuation of its pores reduces the rate of operation of said motor.

2. A differential pressure motor comprising:
   a pair of opposed walls closed by a flexible portion to define a variable volume chamber such that one of said walls is movable towards the other when a pressure differential is created across said one of said walls;
   a valve device operatively connected to said motor to monitor the pressure differential;
   a vacuum source communication means in fluid communication with said valve device whose communication within said motor is monitored by said valve device;
   a positive pressure source differing from said vacuum source, which positive pressure source is in fluid communication with said valve device and whose communication within said motor is also monitored by said valve device;
   a pressure damping means within said differential pressure motor including a porous, collapsible mass in the variable volume chamber between the opposed walls, said porous collapsible mass having the pores thereof open to the interior of said variable volume chamber to prevent sudden erratic movement of said one of said walls toward the other in that the porous collapsible nature of the mass is such that the evacuation of its pores reduces the rate of operation of said motor; and
   a means operatively connected to said differential pressure motor, which means includes a cam surface operatively arranged to position said valve device to schedule either said vacuum source or said positive pressure source within said motor, said means further including a lost motion connection arranged to first move said valve device and thereafter contact said one of said walls to manually move it towards the other of said walls in the event a pressure differential across said one of said walls is inoperative to move same.

References Cited by the Examiner
UNITED STATES PATENTS

| | | | |
|---|---|---|---|
| 2,828,720 | 4/1958 | Ingres | 91—377 |
| 2,896,586 | 7/1959 | Ayers | 91—377 |
| 2,937,620 | 5/1960 | Ayers | 91—377 |
| 3,104,590 | 9/1963 | Kellogg et al. | 123—98 X |

MARK NEWMAN, Primary Examiner.

FRED E. ENGELTHALER, Examiner.